(12) United States Patent
Moyna

(10) Patent No.: US 9,987,879 B2
(45) Date of Patent: Jun. 5, 2018

(54) DUAL WHEEL MOUNTING DEVICE

(71) Applicant: John P. Moyna, Elkader, IA (US)

(72) Inventor: John P. Moyna, Elkader, IA (US)

( * ) Notice: Subject to any disclaimer, the term of this patent is extended or adjusted under 35 U.S.C. 154(b) by 2 days.

(21) Appl. No.: 15/212,611

(22) Filed: Jul. 18, 2016

(65) Prior Publication Data

US 2018/0015780 A1    Jan. 18, 2018

(51) Int. Cl.
*B60B 11/06* (2006.01)
*B60B 11/02* (2006.01)

(52) U.S. Cl.
CPC .............. *B60B 11/02* (2013.01); *B60B 11/06* (2013.01)

(58) Field of Classification Search
CPC ......... B60B 11/00; B60B 11/02; B60B 11/06; B60B 3/10
See application file for complete search history.

(56) References Cited

U.S. PATENT DOCUMENTS

| | | | | |
|---|---|---|---|---|
| 3,840,273 A | * | 10/1974 | Johns | B60B 11/02 301/35.628 |
| 4,427,237 A | * | 1/1984 | Beegle | B60B 11/06 301/13.2 |
| 4,526,425 A | * | 7/1985 | Schroeder | B60B 11/02 301/36.1 |
| 4,787,679 A | * | 11/1988 | Arnold | B60B 11/06 301/13.2 |
| 6,390,564 B1 | * | 5/2002 | Thomas | B60B 11/00 301/13.2 |
| 8,678,518 B2 | * | 3/2014 | Rivera | B60B 11/06 301/105.1 |
| 8,690,265 B2 | * | 4/2014 | Noblanc | B60B 11/02 301/36.1 |
| 2007/0108835 A1 | * | 5/2007 | Hill | B60B 11/06 301/35.628 |

* cited by examiner

*Primary Examiner* — Jason R Bellinger
(74) *Attorney, Agent, or Firm* — Zarley Law Firm, P.L.C.

(57) ABSTRACT

A dual wheel mounting device having an inner wheel mount, a plurality of spaced fins connected to and extending outwardly from the inner wheel mount, and a plurality of U-shaped ribs aligned with and connected to the spaced fins. An outer ring is received within and connected to slots in the U-shaped ribs.

20 Claims, 2 Drawing Sheets

DUAL WHEEL MOUNTING DEVICE

BACKGROUND OF THE INVENTION

This invention is directed to a device for mounting wheels to a vehicle and more particularly a dual wheel mounting device.

The use of multiple wheels on heavy construction equipment is well-known within the art. While useful, current devices for mounting multiple wheels present problems. As one example, in part due to the weight and required tire pressure, heavy equipment has a tendency to sink in wet and/or muddy soil conditions. Also, debris can become caught between wheels during operation. Therefore, a need exists in the art for a device that addresses these deficiencies.

An objective of the present invention is to provide a tire mounting device that permits equipment to float over wet and muddy soil conditions.

Another objective of the present invention is to provide a wheel mounting device that reduces ground pressure.

A still further objective of the present invention is to provide a wheel mounting device that conserves fuel, increase operational speed, stability, and safety.

SUMMARY OF THE INVENTION

A dual tire mounting device having an inner wheel mount connected to an axle. Connected to and extending outwardly from the inner wheel mount are a plurality of spaced apart fins. Aligned with and connected to the fins are a plurality of ribs that is preferable U-shaped. Connected to the ribs is an outer ring.

DETAILED DESCRIPTION OF THE PREFERRED EMBODIMENT

Figure 1:
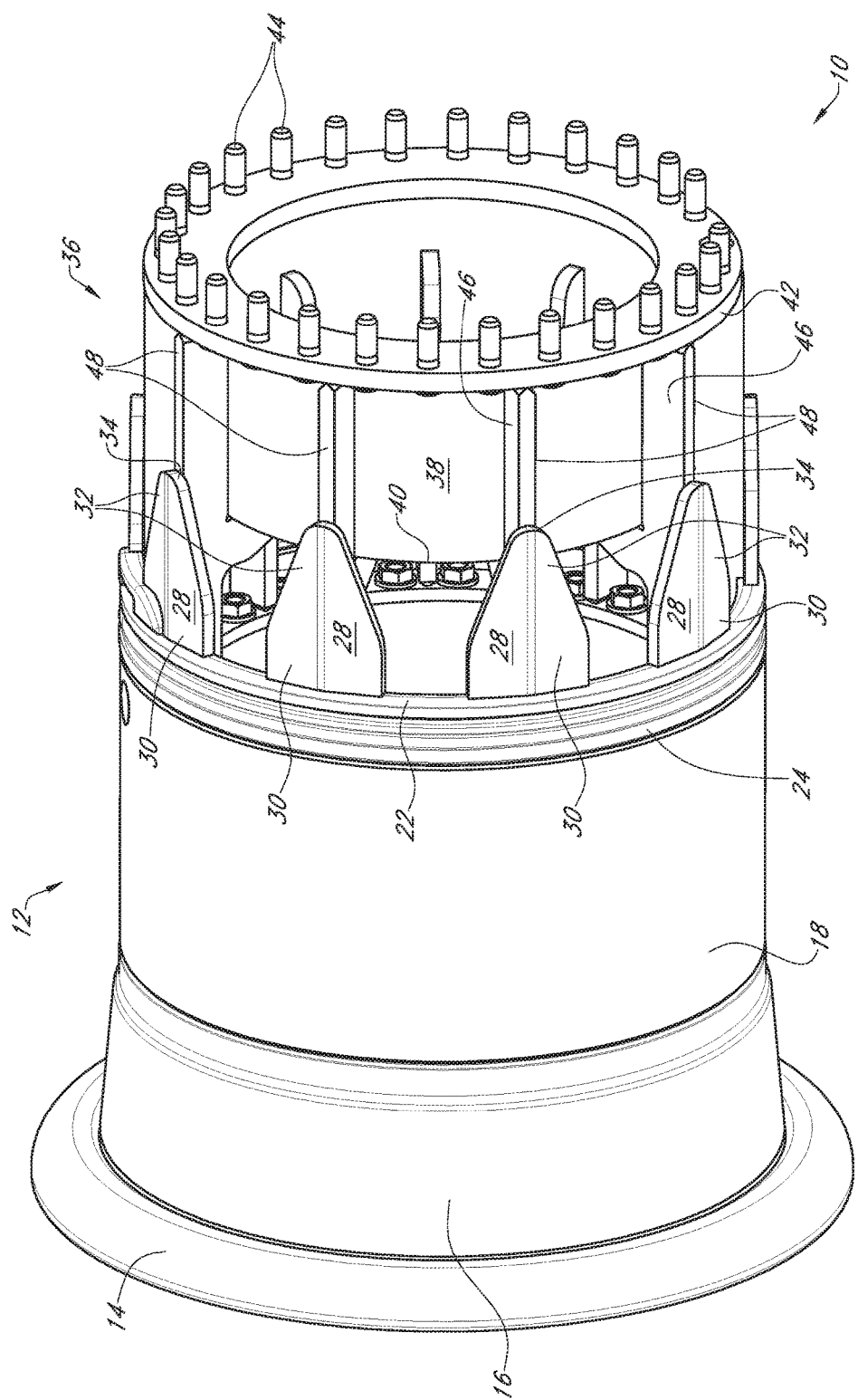
FIG. 1 is a perspective view of a dual tire mounting device.
Figure 2:
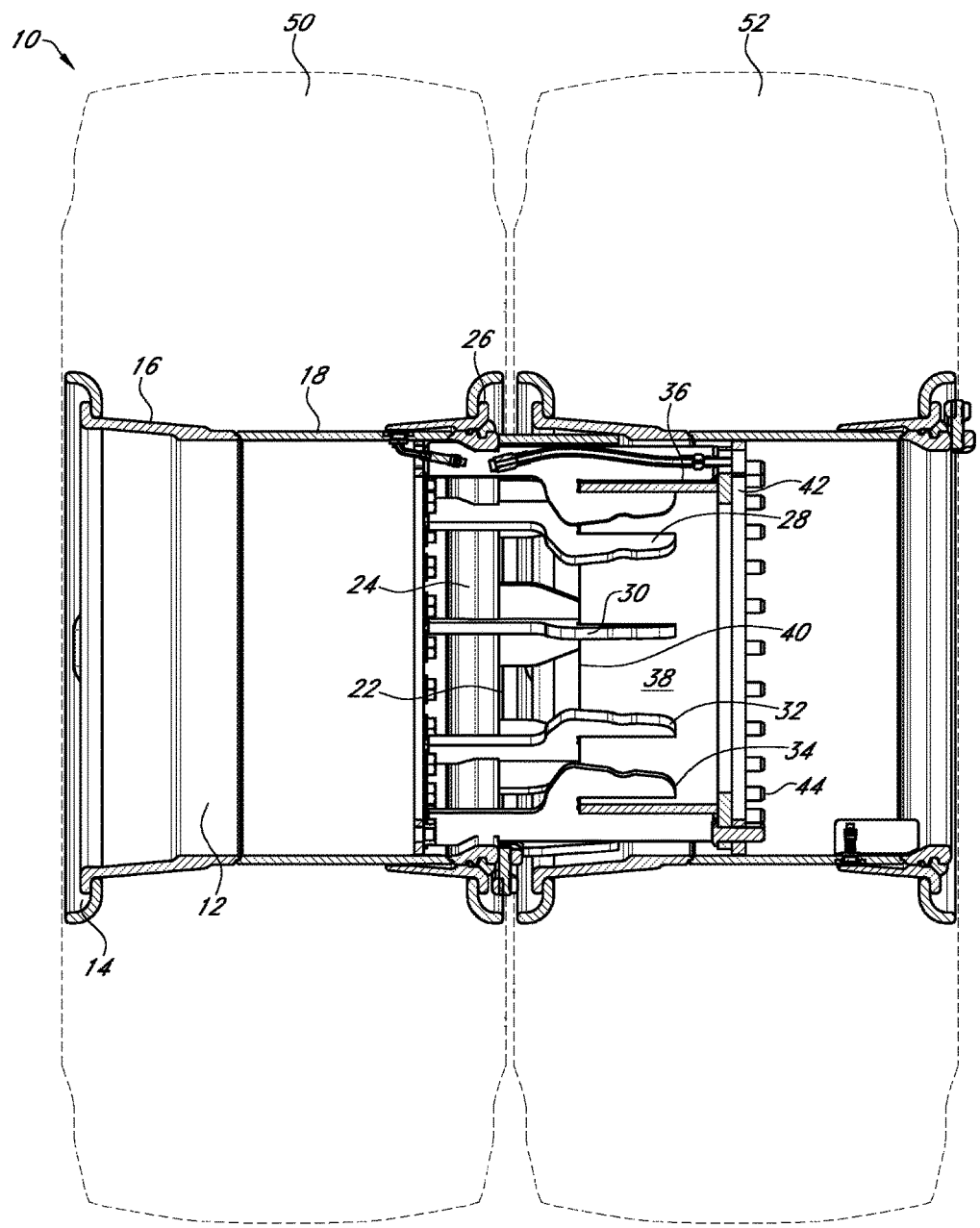
FIG. 2 is a side sectional view of a dual tire mounting device.

Referring to the Figures, a dual tire mounting device 10 has a hollow inner wheel mount 12 having an annular flange 14, a first drop rim 16 and a second drop rim 18. Disposed within the inner wheel mount 12 adjacent the annular flange 14 is an axle hub that is attached to a drive axle (not shown).

An outer end 22 of the inner wheel mount 12 has an annular groove 24 that removably receives a collar 26. Connected to and extending outwardly from the outer end 22 of the inner wheel mount 12 are a plurality of spaced apart fins 28. The fins 28 are of any size, shape, and structure and in one example the fins 28 have a base portion 30 that is connected to the outer end 22 and that terminate in a tapered portion 32 that tapers inwardly to an apex 34 as the tapered portion 32 extend outwardly.

The fins 28 are connected to an outer ring 36 at or near the apex 34. The outer ring 36 has a cylindrical wall 38 having an inner end 40 and an outer bolt ring 42 at the opposite end. Extending outwardly from the outer bolt ring 42 are studs 44 that are threaded. The outer ring 36 has a smaller diameter than the inner hub 12.

The outer ring 36 is received within the slots 46 of a plurality of spaced U-shaped ribs 48. The ribs 48 align with and are connected to the fins 28.

In operation, the inner wheel mount 12 is connected to the axle by aligning and bolting the axle hub 20 to the axle. A first tire 50 is fitted to the inner wheel mount 12 and collar 26 is positioned to be received within annular groove 24. A second tire 52 is then placed over and attached to the outer ring 36 by placing a hub of tire 52 over bolt ring studs 44 and securing with nuts.

Preferably, tires 50 and 52 aligned slots 54 that receive a separator ring 56. Preferably, the separator ring is made of polyurethane.

What is claimed is:

1. A dual mounting device, comprising:
   an inner wheel mount;
   a plurality of spaced fins connected to and extending outwardly from the inner wheel mount; and
   an outer ring connected to the spaced fins;
   wherein the outer ring is received within slots of U-shaped ribs that are aligned with and connected to the spaced fins.

2. The device of claim 1 wherein a first tire is mounted to the inner wheel mount, a second tire is mounted to the outer ring.

3. The device of claim 1 wherein the outer ring has a diameter smaller than a diameter of the inner wheel mount.

4. The device of claim 1 further comprising the inner wheel mount having an annular flange, a first drop rim, and a second drop rim.

5. The device of claim 1 further comprising the inner wheel mount having an annular groove at an outer end to removably receive a collar.

6. The device of claim 1 further comprising the plurality of fins having a base portion and a tapered portion.

7. The device of claim 6 further comprising the base portion connected to an outer end of the inner wheel mount.

8. The device of claim 6 further comprising the tapered portion tapering inwardly to an apex as the tapered portion extends outwardly from the inner wheel mount.

9. The device of claim 8 further comprising the plurality of fins connected to the outer ring adjacent the apex.

10. The device of claim 1 further comprising the outer ring having a cylindrical wall, wherein the cylindrical wall has an inner end and an outer bolt ring.

11. The device of claim 10 further comprises a plurality of studs extending outwardly from the outer bolt ring.

12. A dual mounting device, comprising:
    an inner wheel mount;
    a plurality of spaced fins connected to and extending outwardly from the inner wheel mount; and
    an outer ring connected to the spaced fins;
    wherein the outer ring has a diameter smaller than a diameter of the inner wheel mount.

13. The device of claim 12 wherein the outer ring is received within slots of ribs that are aligned with and connected to the plurality of spaced rings.

14. The device of claim 12 wherein a first tire is mounted to the inner wheel mount, a second tire is mounted to the outer ring.

15. The device of claim 13 further comprising the inner wheel mount having an annular groove at an outer end to removably receive a collar.

16. The device of claim 13 further comprising the plurality of fins having a base portion and a tapered portion.

17. The device of claim 16 further comprising the base portion connected to an outer end of the inner wheel mount.

18. The device of claim 16 further comprising the tapered portion tapering inwardly to an apex as the tapered portion extends outwardly from the inner wheel mount.

19. The device of claim 18 further comprising the plurality of fins connected to the outer ring adjacent the apex.

20. The device of claim 12 further comprising the outer ring having a cylindrical wall, wherein the cylindrical wall has an inner end and an outer bolt ring.

* * * * *